United States Patent [19]
Baek et al.

[11] Patent Number: 6,136,738
[45] Date of Patent: Oct. 24, 2000

[54] SILICON NITRIDE SINTERED BODY WITH REGION VARYING MICROSTRUCTURE AND METHOD FOR MANUFACTURE THEREOF

[75] Inventors: Yong Kee Baek, Daejon; Hyoun-Ee Kim, Seoul; Won Ho Lee, Seoul; Ki Min Lee, Seoul; Seung Su Baek; Eul Son Kang, both of Daejon, all of Rep. of Korea

[73] Assignee: Agency for Defense Development, Daejon, Rep. of Korea

[21] Appl. No.: 09/222,241

[22] Filed: Dec. 28, 1998

[30] Foreign Application Priority Data

Dec. 27, 1997 [KR] Rep. of Korea ............... 97-74898

[51] Int. Cl.⁷ ................................. C04B 35/584
[52] U.S. Cl. .......................... 501/97.2; 264/683
[58] Field of Search ................ 501/97.2; 264/683

[56] References Cited

U.S. PATENT DOCUMENTS

| | | | |
|---|---|---|---|
| 4,628,039 | 12/1986 | Mizutani et al. | 501/97 |
| 4,806,510 | 2/1989 | Kanai et al. | 501/97 |
| 5,545,597 | 8/1996 | Yeckley | 501/98 |
| 5,648,028 | 7/1997 | Miyake et al. | 264/647 |
| 5,921,725 | 7/1999 | Kashiwagi et al. | 407/119 |

*Primary Examiner*—Ngoclan Mai
*Attorney, Agent, or Firm*—Skjerven Morrill MacPherson, LLP; George Wolken, Jr.; Alan H. MacPherson

[57] ABSTRACT

A silicon nitride sintered body is obtained by mixing 2~16 wt % of $Yb_2O_3$ as a sintering additive with $Si_3N_4$ powders including unavoidable impurities, pressing the mixed powder into a desired form, and gas-pressure sintering the thusly pressed form, whereby an inner region of the sintered body has a fine microstructure, and an outer region thereof has a mixed microstructure in which elongated grains and fine grains co-exist and a method for manufacturing a silicon nitride sintered body, includes the steps of: adding and mixing 2~16 wt % of $Yb_2O_3$ powder as a sintering additive into a silicon nitride ($Si_3N_4$) powder; ball-milling the mixed powder to obtain a slurry; drying and classifying the slurry; press-forming the resultant powder in a die uniaxially and isostatically; and gas-pressure sintering the resultant compact body at a temperature in the range of 1800~2000° C., whereby an inner region of the resultant sintered body has a fine microstructure, and an outer region of the resultant sintered body has a mixed microstructure in which elongated grains and fine grains co-exist.

9 Claims, 7 Drawing Sheets

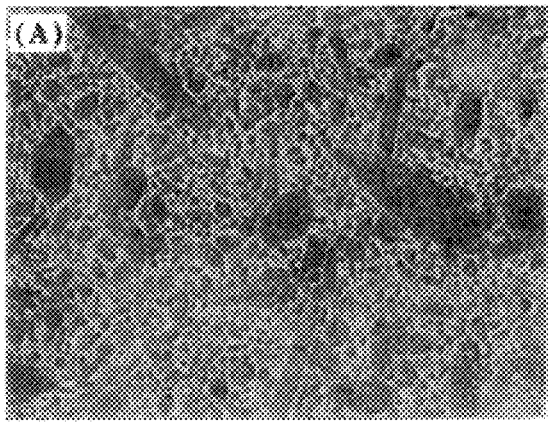
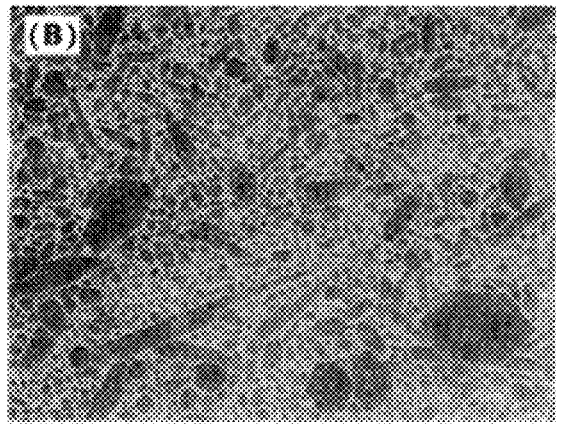
FIG. 2A
FIG. 2B
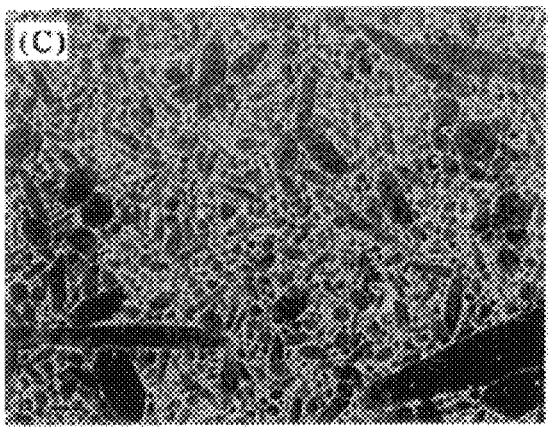
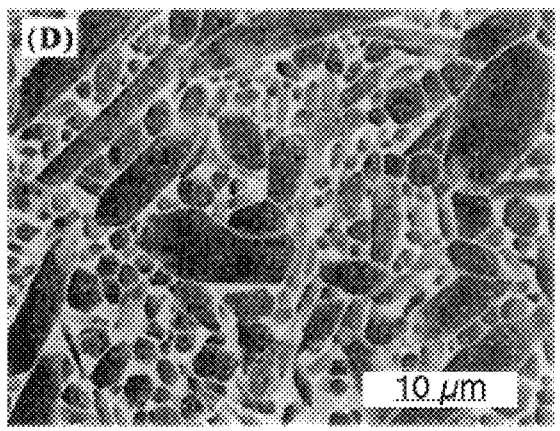
FIG. 2C
FIG. 2D

SILICON NITRIDE SINTERED BODY WITH REGION VARYING MICROSTRUCTURE AND METHOD FOR MANUFACTURE THEREOF

BACKGROUND OF THE INVENTION

1. Field of the Invention

The present invention is related to silicon nitride ceramics and more particularly to a method for controlling the microstructure of a silicon nitride ceramic to vary depending on the region therein and to a method for manufacture thereof.

2. Description of the Background Art

Silicon nitride ($Si_3N_4$) ceramics are one of the leading candidate materials for high-temperature engineering applications because of their excellent thermo-mechanical properties. It is well known that densification of Si3N4 is achieved by liquid-phase sintering using metal oxides such as $Y_2O_3$, $Al_2O_3$, and rare-earth oxides as sintering additives. During sintering, these additives form an eutectic liquid around 1500° C. together with $SiO_2$ present at the surface of the $Si_3N_4$ starting powder. This liquid phase promotes the transformation from β-phase as well as the densification. Due to this liquid phase sintering process, a $Si_3N_4$ sintered body has an unique microstructure; large elongated grains randomly dispersed in fine matrix grains.

Elongated grains in the densified specimen play an important role in determining the mechanical properties of $Si_3N_4$. During the fracture process, these elongated grains resist crack propagation effectively, like whiskers or fibers in composite materials, resulting in the increase in fracture toughness of the material. However, excessive growth of the elongated grains tends to decrease the stength of the $Si_3N_4$ due to the formation of large defects around the grains.

To increase the strength and the fracture toughness of $Si_3N_4$ at the same time, it is necessary to combine these two distinct microstructures in one material. One approach for this combination is fabricating a layered composite material. Strength of a ceramic is determined by the microstructure of the surface material because fracture is initiated from flaws at the surface. On the other hand, the fracture toughness is a property of the bulk because it represents the resistance of the material against crack propagation after formation of the crack. Therefore, to increase both the strength and the fracture toughness of $Si_3N_4$ at the same time, the microstructure of the surface layer should be fine and homogeneous and that of the bulk layer should be large and elongated. By making a layered composite, in which a layer with a fine microstructure is placed on the top of a bulk layer having large elongated grains dispersed in fine matrix grains, both the strength and the fracture toughness of a $Si_3N_4$ ceramic have been improved.

A disadvantage of this technique is that this type of material can only be fabricated by using a hot-pressing process. This fabrication technique restricts the shape of the material to only the simplest ones. In addition, the hot-pressing process is very expensive to implement and is not suitable for the mass production of materials.

SUMMARY OF THE INVENTION

In view of the above needs, it is an object of this invention to provide a dense $Si_3N_4$ body with a controlled microstructure having improved mechanical properties.

It is another object of this invention to provide a $Si_3N_4$ body that haslarge elongated grains at one side and relatively small elongated grains at the other side of the body.

According to the present invention, a silicon nitride sintered body is obtained by adding 2~16 wt % of $Yb_2O_3$ as a sintering additive into $Si_3N_4$ powers including unavoidable impuirities, wherein the inner region of the sintered body has a fine microstructure, and the outer region thereof has a mixed microstructure in which elongated grains and fine grains co-exist.

Also, according to the present invention, a method is provided for manufacturing a silicon nitride sintered body, comprising the steps of: adding and mixing 2~16 wt % of $Yb_2O_3$ powder as a sintering additive into a silicon nitride ($Si_3N_4$) powder; ball-milling the mixed powder to obtain a slurry; drying and classifying the slurry; press-forming the resultant powder in a die uniaxially and isostatically; and then gas-pressure sintering the resultant compact body in the temperature range of 1800~2000° C., whereby the inner region of the resultant sintered body has a fine microstructure, and the outer region of the resultant sintered body has a mixed microstructure in which elongated grains and fine grains co-exist.

BRIEF DESCRIPTION OF THE DRAWINGS

Other objects and aspects of the invention will come apparent from the following description of embodiments with reference to the accompanying drawings in which;

FIGS. 2A to 2D are SEM micrographs of the inner region of gas-pressure sintered $Si_3N_4$ with respective differing amounts of $Yb_2O_3$ as a sintering additive, wherein FIG. 2A shows the case where 2 wt % of $Yb_2O_3$ was added, FIG. 2B shows the case where 4 wt % of $Yb_2O_3$ was added, FIG. 2C shows the case where 8 wt % of $Yb_2O_3$ was added, and FIG. 2D shows the case where 16 wt % of $Yb_2O_3$ was added.

FIGS. 3A to 3D are SEM micrographs of the outer region of the gaspressure sintered $Si_3N_4$ with respective differing amounts of $Yb_2O_3$ as a sintering additive, wherein FIG. 3A shows the case where 2 wt % of $Yb_2O_3$ was added, FIG. 3B shows the case where 4 wt % of $Yb_2O_3$ was added, FIG. 3C shows the case where 8 wt % of $Yb_2O_3$ was added, and FIG. 3D shows the case where 16 wt % of $Yb_2O_3$ was added.

DETAILED DESCRIPTION OF THE INVENTION

The usefulness of $Si_3N_4$ may be significantly enhanced by controlling the microstructure of the material, because the mechanical properties of a $Si_3N_4$ sintered body are strongly dependent on the microstructure. For example, when the microstructure of $Si_3N_4$ is fine and homogeneous, the strength of the material is high while the fracture toughness is low. On the other hand, if the microstructure consists of large elongated grains randomly dispersed in a fine matrix, the fracture toughness of the material is high, but its strength is low. Fracture of most ceramics including $Si_3N_4$ is initiated from flaws at the surface, and therefore, the strength of a ceramic is determined by the microstructure of the surface layer. Contrary to this, the fracture toughness is a property of the bulk because it represents the resistance of the material against crack propagation after the formation of the crack. Therefore, to increase both the strength and the fracture toughness of $Si_2N_4$ at the same time, the microstructure of the surface layer should be fine and homogeneous and that of the bulk layer should be large and elongated.

Figure 7:
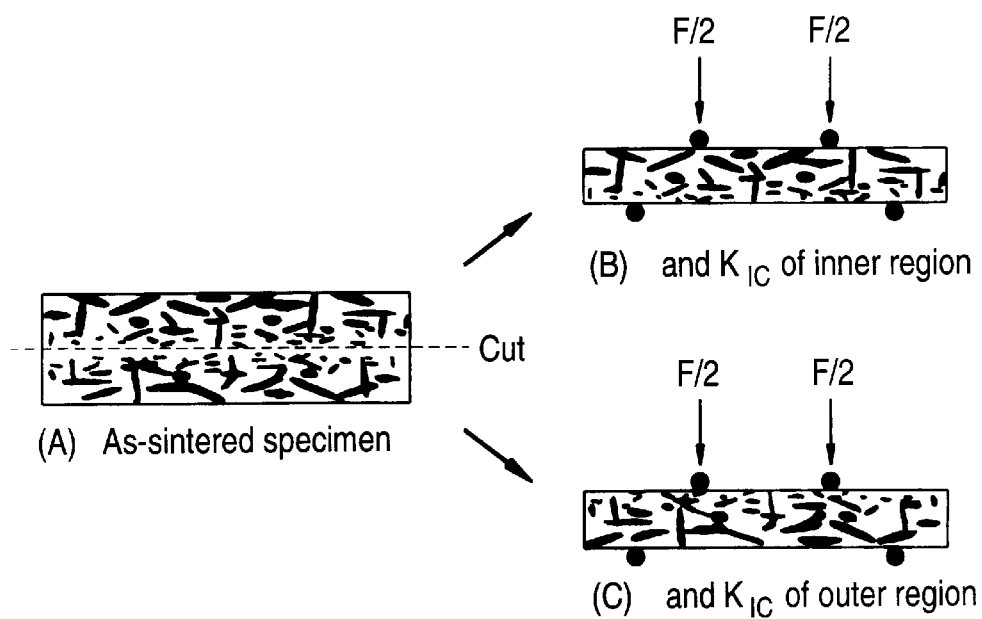
FIG. 7 is a schematic diagram showing a machined $Si_3N_4$ body and application of a load thereto.

The addition of $Yb_2O_3$ has significant effects on the microstructural evolution of gas-pressure sintered $Si_3N_4$. The microstructure of the $Si_2N_3$ is not uniform throughout the material; very large elongated grains are formed in a fine matrix near the surface of the material, while relatively small grains are formed at the inner region of the material. Therefore, a $Si_3N_4$ body with a different microstructure depending on the region therein can be obtained by halving a bulk body into two. By selecting the side with a fine microstructure as a load bearing side of tensile stress, as schematically shown in FIG. 7, both the strength and the fracture toughness are improved significantly.

The composition and process described in the following example is intended to be illustrative only and not in any way limitative of the scope of the invention.

Persons of ordinary skill in the art should be able to envision variations on the general principle of this invention that fall within the scope of the claims that follow.

EXAMPLE

A high-purity powder of α-$Si_3N_4$ with a specific surface area of 11.5 m²/g, an oxygen content of 1.45 wt %, and an α/(α+β) ratio of 98% was used as a starting material. As a sintering aid, 2~16 wt % $Yb_2O_3$ was used. The powders were mixed in a polyurethane bottle for 24 hours using silicon nitride balls and ethanol as a medium. After drying, the powder mixture was uniaxially pressed in a die and then isostatically pressed under a pressure of 130 Mpa to form a compact. The compact was gas-pressure sintered at a temperature between 1800 and 2000° C. in a $N_2$ gas pressure of 10~100 atm, after being placed in a BN-coated carbon crucible and covered with packing powder of the same composition.

Figure 1A:
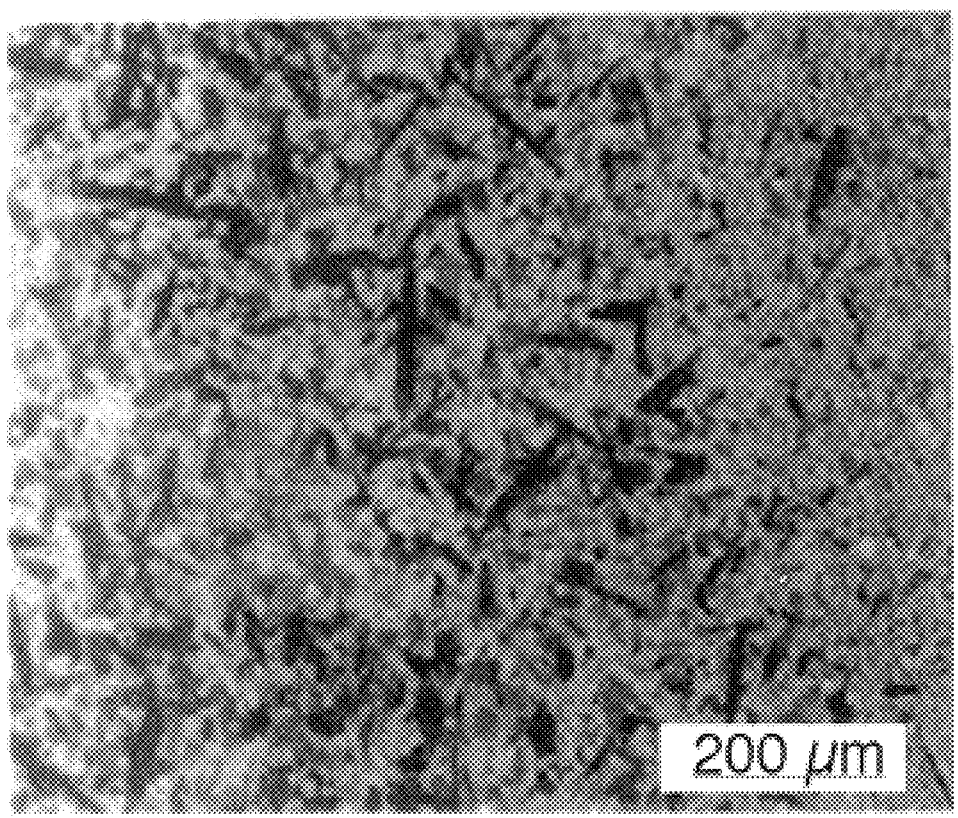
FIG. 1 is SEM (Scanning Electron Microscope) micrograph of a gas-pressure sintered $Si_3N_4$ with 2~16 wt % $Yb_2O_3$ as a sintering additive in accordance with the present invention.
Figure 1B:
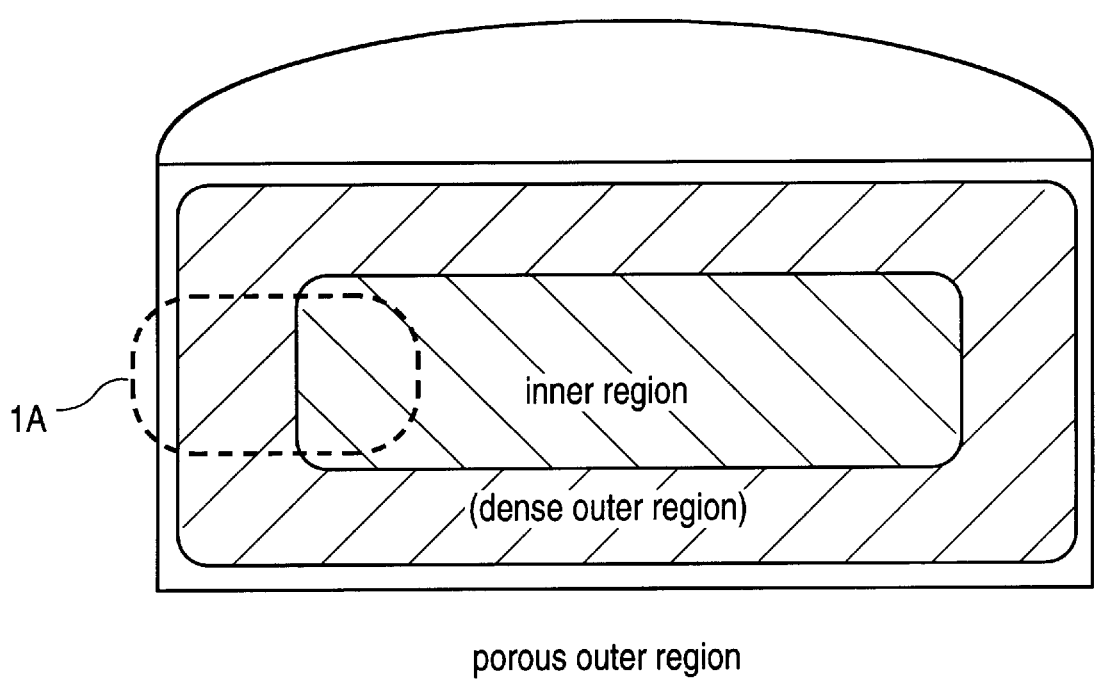
Figure 3A:
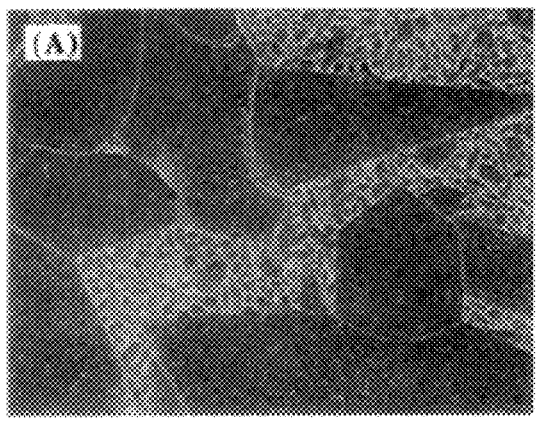
Figure 3B:
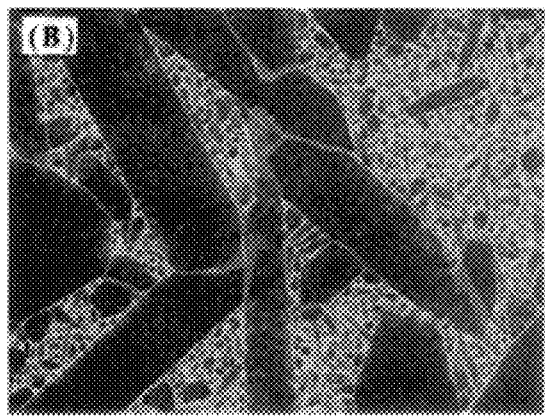
Figure 3C:
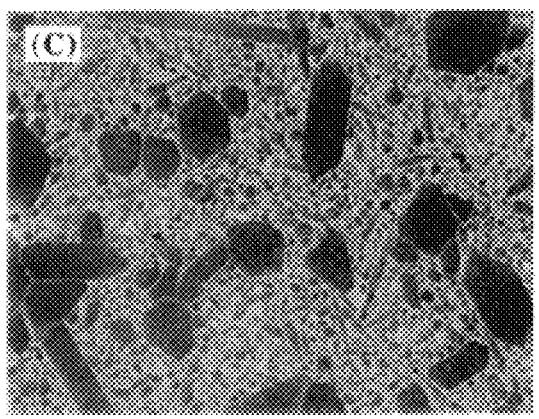
Figure 3D:
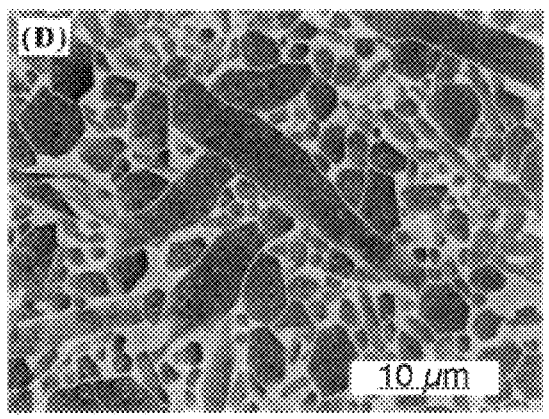
Figure 4:
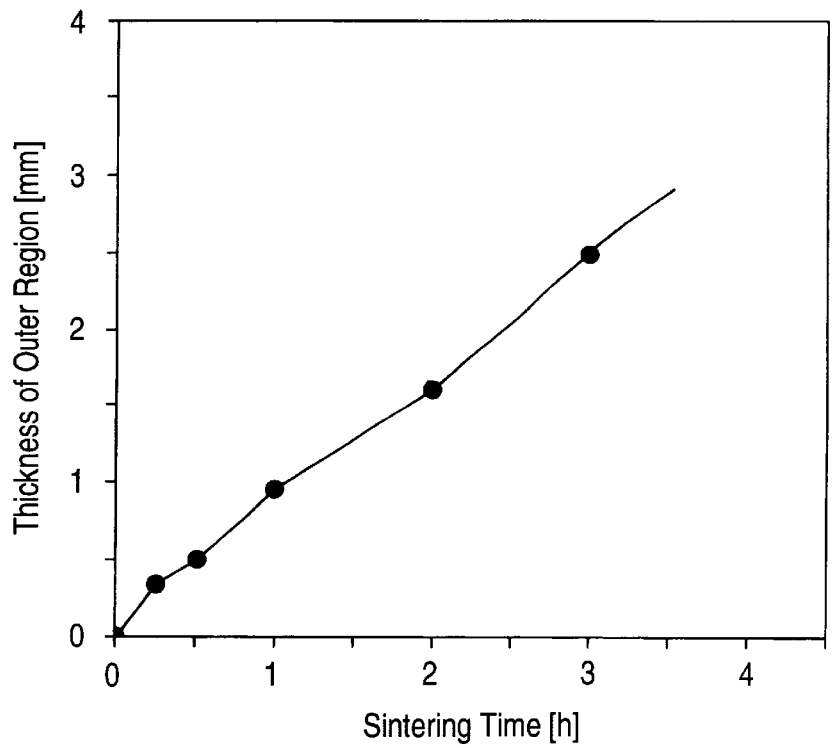
FIG. 4 is a graph showing the relation between the thickness of the outer region of the inventive material and the sintering time.

The microstructural evolutions of the outer and the inner regions of the sintered $Si_3N_4$ are shown in FIG. 1. The microstructure of the $Si_3N_4$ containing $Yb_2O_3$ as a sintering aid is not uniform throughout the specimen. The size of the elongated grains at the outer region of the specimen is much larger than that at the inner region. The sizes of the grains at the inner region and at the outer region are shown in FIG. 2 and FIG. 3, respectively. FIGS. 2A to 2D are SEM micrographs of the inner region of the gas-pressure sintered Si3N4 under different adding amounts of $Yb_2o_3$ as a sintering additive, wherein FIG. 2A shows the case where 2 wt % of $Yb_2O_3$ was added, FIG. 2B shows the case where 4 wt % of $Yb_2O_3$ was added, FIG. 2C shows the case where 8 wt % of $Yb_2O_3$ was added, and FIG. 2D shows the case where 16 wt % of $Yb_2O_3$ was added. FIGS. 3A to 3D are SEM micrographs of the outer regions of the gas-pressure sintered $Si_3N_4$ under having different amounts of $Yb_2O_3$ added as a sintering additive, wherein FIG. 3A shows the case where 2 wt % of $Yb_2O_3$ was added, FIG. 3B shows the case where 4 wt % of $Yb_2O_3$ was added, FIG. 3C shows the case where 8 wt % of $Yb_2O_3$ was added, and FIG. 3D shows the case where 16 wt % of $Yb_2O_3$ was added. Based on these micrographs, the strength can be expected to be higher at the inner region and the fracture toughness can be expected to be higher at the outer region. The thickness of the outer region increased almost linearly with sintering time as shown in FIG. 4.

Figure 5:
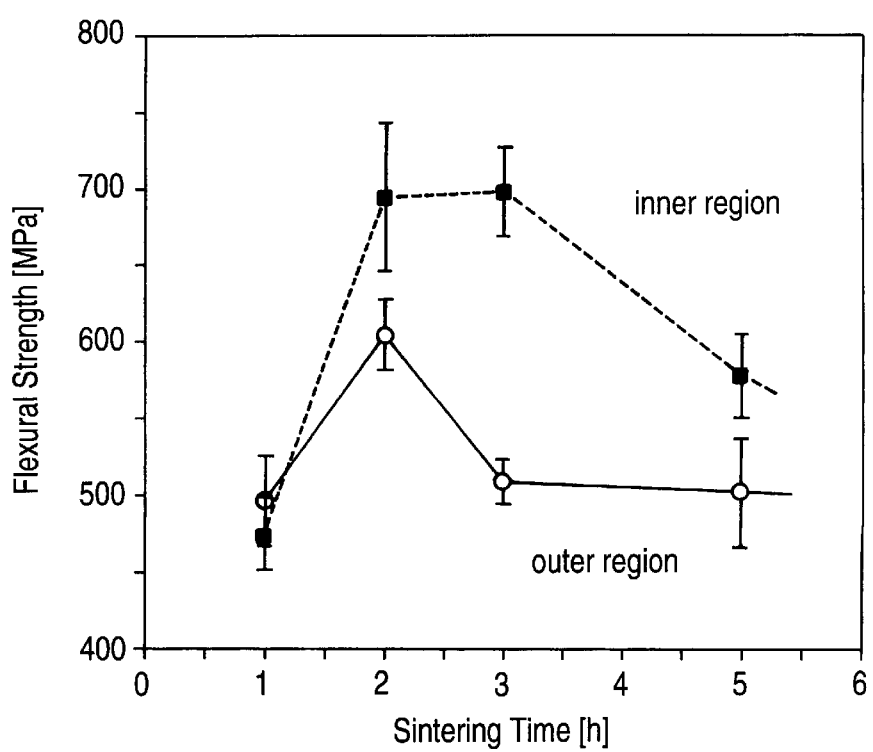
FIG. 5 is a graph showing the relation between the flexural strength of the inner and the outer region of the inventive material and the sintering time.

Specimens for mechanical tests were cut and machined into a bar shape with dimensions of 2.5×3.5×25 mm. All the specimens were ground with a 600-grit diamond wheel and the tensile surfaces were polished with diamond slurries down to a roughness of 1 μm. The strength was measured by a four-bending configuration with a crosshead speed of 0.5 mm/min, and inner and outer spans of 10 and 20 mm, respectively. The flexural strengths of each region of the specimens sintered for various periods of time are shown in FIG. 5. The fracture toughness was determined by the indentation-strength method with an applied load of 196 N for 15 s. Variations in the fracture toughness depending on the region of the specimens with sintering time are shown in FIG. 6.

Figure 6:
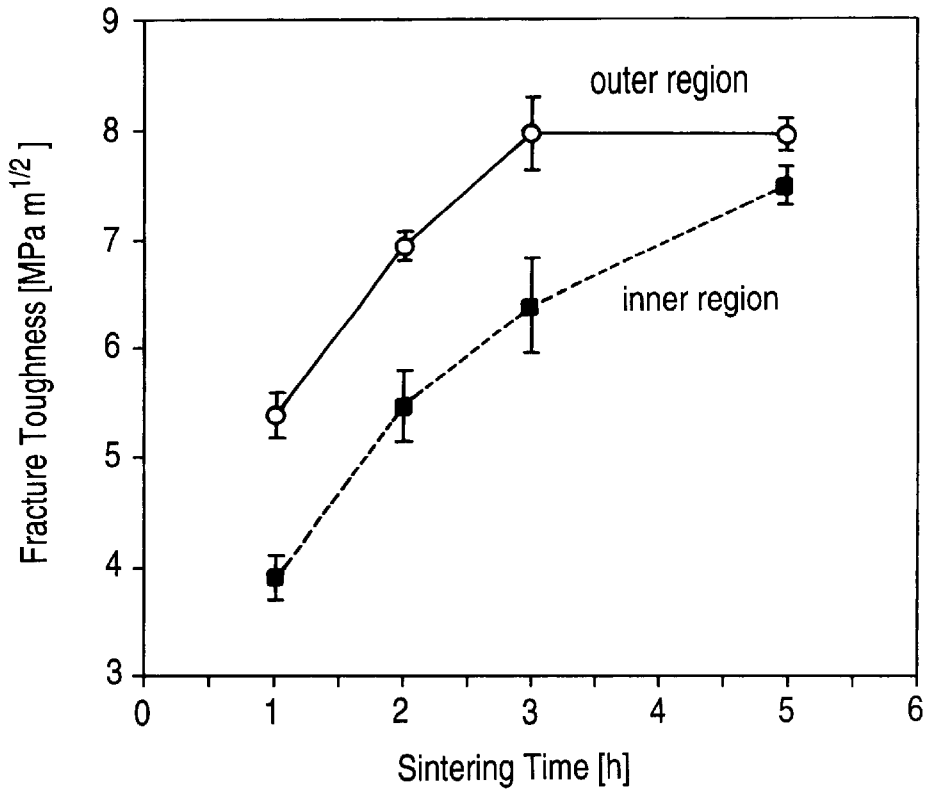
FIG. 6 is a graph showing the relation between fracture toughness of the inner and the outer regions of the inventive material and the sintering time.

As shown FIG. 5 and FIG. 6, the strength is higher at the inner region and the fracture toughness is higher at the outer region. Therefore, if the sintered body is machined and loaded as schematically shown in FIG. 7, it would have high strength and fracture toughness at the same time.

Figure 8:
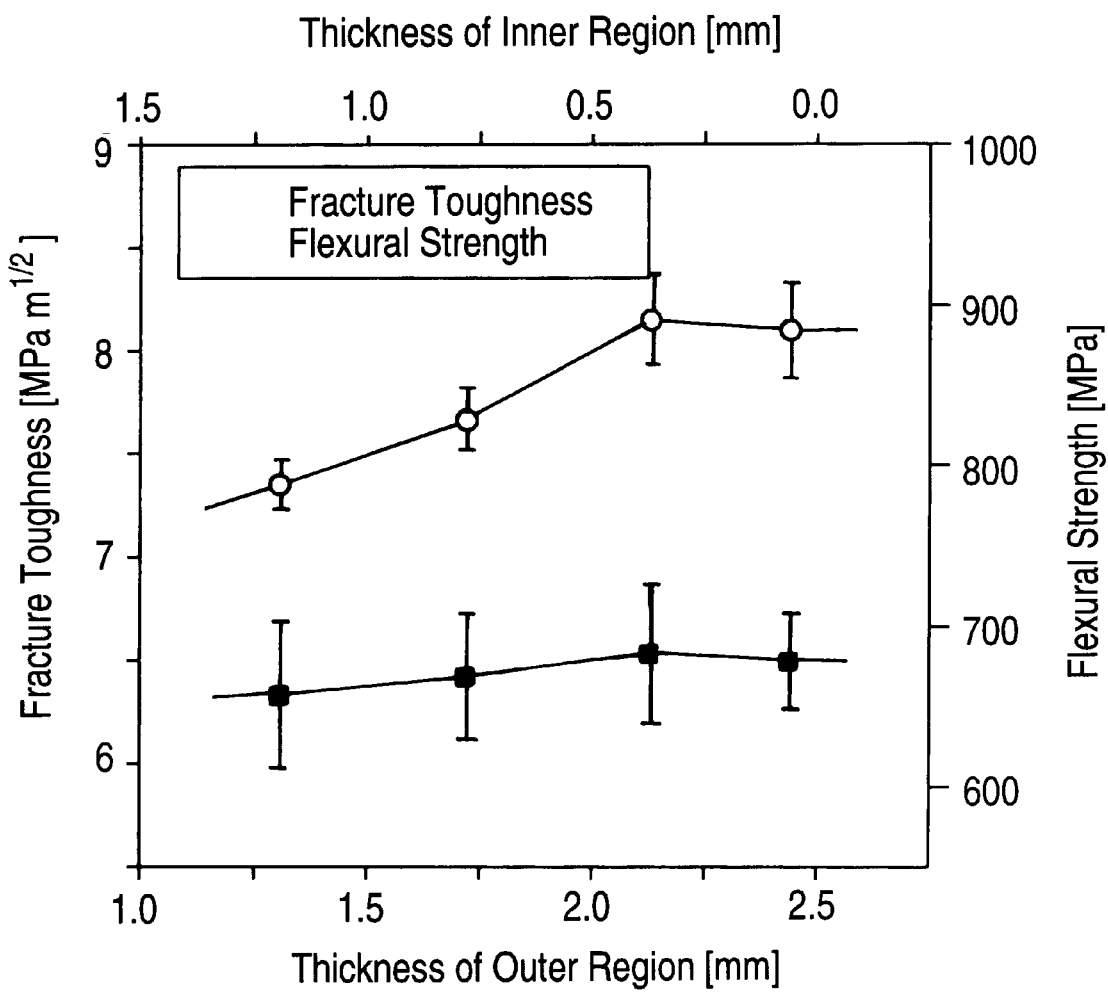
FIG. 8 is a graph showing mechanical properties of the inventive $Si_3N_4$ material as a function of the relative thickness of the layers thereof.

The strength and the fracture toughness of the machined specimens, shown in FIG. 8, proves that the expected results are actually obtained; as the thickness of the inner layer becomes thinner, the strength increases while the fracture toughness remains constant. As a result, by machining a gas-pressure sintered $Si_3N_4$ body to have a thin inner layer and a thick outer layer, and applying load as shown in FIG. 7, a $Si_3N_4$ body with high strength and fracture toughness is obtained.

What is claimed is:

1. A silicon nitride sintered body obtained by mixing 2~16 wt % $Yb_2O_3$ as a sintering additive with $Si_3N_4$ powders including unavoidable impurities, pressing the mixed powder into a desired form, and gas-pressure sintering the thusly pressed from, whereby an inner region of the sintered body has a fine microstructure, and an outer region thereof has a mixed microstructure in which elongated grains and fine grains co-exist.

2. The silicon nitride sintered body according to claim 1, wherein the fine grains of the inner region are up to 10~20 μm in length and up to 2~4 μm in diameter.

3. The silicon nitride sintered body according to claim 1, wherein the elongated grains of the outer region may be controlled 100 to 200 μm in length and 10 to 20 μm in diameter.

4. The silicon nitride sintered body according to claim 1, wherein the thickness of the outer region depends on the sintering time.

5. A method for manufacturing a silicon nitride sintered body, comprising the step of:

adding and mixing 2~16 wt % of $Yb_2O_3$ powder as a sintering additive into a silicon nitride ($Si_3N_4$) powder;

ball-milling the mixed powder to obtain a slurry; drying and classifying the slurry;

press-forming the resultant powder in a die uniaxially and isostatically; and gas-pressure sintering the resultant compact body at a temperature in the range of 1800~2000° C., whereby an inner region of the resultant sintered body has a fine microstructure, and an outer region of the resultant sintered body has a mixed microstructure in which elongated grains and fine grains co-exist.

6. The method according to claim 5, wherein the thickness of the outer region depends on the sintering time.

7. The method according to claim 5, wherein the gas is nitrogen and the pressure is from approximately 10 atm to approximately 100 atm.

8. The method according to claim 6, wherein the sintering time is from approximately 1 hour to approximately 5 hours.

9. The method according to claim 6, wherein the thickness of the outer region is from approximately 0.5 mm to approximately 2.5 mm.

* * * * *